United States Patent
Endo

(10) Patent No.: US 8,249,389 B2
(45) Date of Patent: Aug. 21, 2012

(54) IMAGE PROCESSING APPARATUS, IMAGE PROCESSING METHOD AND IMAGING APPARATUS

(75) Inventor: Hisashi Endo, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 861 days.

(21) Appl. No.: 12/370,692

(22) Filed: Feb. 13, 2009

(65) Prior Publication Data

US 2009/0208135 A1   Aug. 20, 2009

(30) Foreign Application Priority Data

Feb. 14, 2008   (JP) ................. P2008-33368

(51) Int. Cl.
*G06K 9/36* (2006.01)
(52) U.S. Cl. ........ 382/284; 382/282; 382/293; 358/540; 358/450
(58) Field of Classification Search .............. 382/282, 382/284, 293; 358/540, 450, 453
See application file for complete search history.

(56) References Cited

U.S. PATENT DOCUMENTS

| | | | |
|---|---|---|---|
| 6,919,892 B1 * | 7/2005 | Cheiky et al. | 345/473 |
| 7,027,054 B1 * | 4/2006 | Cheiky et al. | 345/473 |
| 7,711,603 B2 * | 5/2010 | Vanker et al. | 705/24 |
| 7,903,048 B2 * | 3/2011 | Yanagisawa | 345/7 |
| 2004/0131278 A1 | 7/2004 | Imagawa et al. | |
| 2005/0225566 A1 | 10/2005 | Kojo | |

FOREIGN PATENT DOCUMENTS

| | | |
|---|---|---|
| JP | 2000-22929 A | 1/2000 |
| JP | 2002-204422 A | 7/2002 |
| JP | 2003-78818 A | 3/2003 |
| JP | 2003-346170 A | 12/2003 |
| JP | 2004-153345 A | 5/2004 |
| JP | 2004-171543 A | 6/2004 |
| JP | 2004-179845 A | 6/2004 |
| JP | 2004-248037 A | 9/2004 |
| JP | 2005-157762 A | 6/2005 |
| JP | 2005-159971 A | 6/2005 |
| JP | 2009-118084 A | 5/2009 |

* cited by examiner

*Primary Examiner* — Yosef Kassa
(74) *Attorney, Agent, or Firm* — Birch, Stewart, Kolasch & Birch, LLP

(57) ABSTRACT

A composite image is generated by a method including: detecting at least one in a captured image; judging arrangement of the at least one subject by an arithmetic operation; selecting at least one composition-purpose image at random in accordance with the arrangement of the at least one subject; determining arrangement of the selected at least one composition-purpose image at random so that the at least one composition-purpose image does not overlap with one another and does not overlap with the detected at least one subject; and generating a composite image by combining the captured image with the at least one composition-purpose image.

17 Claims, 21 Drawing Sheets

Image group for center | Image group for periphery

| | | | | |
|---|---|---|---|---|
| Maxim size | 3 times | 2 times | 2 times | 1.2 times |
| Minimum size | 0.5 times | 0.7 times | 1 time | 1 time |
| Maximum inclination | No limit | ±10 degrees | ±30 degrees | ±20 degrees |

Case where faces are close to each other
Smaller than threshold value TH

Case where faces are far from each other
Equal to or larger than threshold value TH Case where faces are close to each other Case where faces are far from each other Case where faces are close to each other Case where faces are far from each other Case where faces are far from each other Case where faces are close to each other Case where faces are far from each other Case where faces are close to each other

IMAGE PROCESSING APPARATUS, IMAGE PROCESSING METHOD AND IMAGING APPARATUS

CROSS-REFERENCE TO RELATED APPLICATIONS

This application is based upon and claims the benefit of priority from the Japanese Patent Application No. 2008-33368 filed on Feb. 14, 2008, the entire contents of which are incorporated herein by reference.

BACKGROUND OF THE INVENTION

1. Technical Field

The invention relates to an image processing apparatus, an image processing method and an imaging apparatus. Particularly, the invention relates to an image processing apparatus, an image processing method and an imaging apparatus for generating a composite image by combining a captured image with a composition-purpose image and displaying the composite image.

2. Description of the Related Art

For example, JP 2004-248037 A, JP 2003-78818 A, JP 2004-153345 A and JP 2005-157762 A describe techniques capable of generating a composite image by combining a captured image with a composition-purpose image at the time of image capturing.

JP 2004-248037 A describes transmitting a location of image capturing to a server at the time of image capturing, receiving from the server clip art images selected at random from additional images provided for each image capturing area, and generating a composite image. Since difference composite images are generated for respective image capturings even in the same image capturing area, surprise and amusement can be provided to a user.

JP 2003-78818 A describes automatically detecting a position of a subject and displaying a ticker (a character string or an explanatory graphic for indicating a name of the subject, description of the subject, etc.) on a screen in accordance with motion of the subject.

JP 2004-153345 A describes that a template image selected by a cameraman is displayed while being superposed on a through image and that when the cameraman determines a composition and shoots, a shot image combined with the template image and a shot image not combined with the template image are stored.

JP 2005-157762 A describes extracting a specific object from a captured image, generating a composite image in which the extracted object is replaced by an exchangeable object registered in advance, and outputting the composite image.

Incidentally, it was impossible to select a composition-purpose image(s) to be adapted for arrangement (position, size and direction) of a subject, the number of subjects and a positional relation between subjects. Moreover, it was impossible to determine arrangement of a composition-purpose image(s) in accordance with the position of a subject and/or the positional relation between subjects. For this reason, there was a possibility that a captured image would be combined with a composition-purpose image that is unmatched with the scene of the captured image or a composition-purpose image would overlap with a subject image or another composition-purpose image.

SUMMARY OF THE INVENTION

The invention has been made in consideration of such circumstances. An object of the invention is to provide an image processing apparatus, an image processing method and an imaging apparatus capable of generating a composite image matched with an arrangement scene by combining a captured image with a composition-purpose image(s) based on a subject(s) in the captured image.

The above objection of the invention is achieved by the following configurations.

[1] According to an aspect of the invention, an image processing apparatus includes a subject detection unit, a subject position analysis unit, an image selection unit, an image arrangement unit and an image composition unit. The subject detection unit detects at least one subject in a captured image. The subject position analysis unit judges arrangement of the at least one subject in the captured image by an arithmetic operation. The image selection unit selects at least one composition-purpose image at random in accordance with the arrangement of the at least one subject. The image arrangement unit determines arrangement of the selected at least one composition-purpose image at random so that the at least one composition-purpose image does not overlap with one another and does not overlap with the detected at least one subject. The image composition unit generates a composite image by combining the captured image with the at least one composition-purpose image.

[2] In the image processing apparatus of [1], the image arrangement unit may select a size for each of the at least one composition-purpose image to be arranged, at random from an image size range that is set in advance.

[3] In the image processing apparatus of any one of [1] to [2], the image arrangement unit may select an inclination for each of the at least one composition-purpose images to be arranged, at random from an image inclination range that is set in advance.

[4] In the image processing apparatus of any one of [1] to [3], when the number of detected subject is two or more, the image arrangement unit may select the at least one composition-purpose image based on an arrangement relation between the detected subjects.

[5] In the image processing apparatus of [4], the image selection unit may select the at least one composition-purpose image based on each distance between the subjects.

[6] In the image processing apparatus of any one of [1] to [5], wherein when the image composition unit generates the composite image from each of continuously captured images, if arrangement of the at least one subject in a current captured image is same as that of the at least one subject in a previous captured image, at least one composition-purpose image that is same as at least one composition-purpose image combined with the previous image may be arranged so as to have a same positional relation with the at least one subject in the current captured image as a positional relation between the at least one subject in the previous captured image and the at least one composition-purpose image combined with the previous captured image.

[7] In the image processing apparatus of any one of [1] to [5], when the image composition unit generates the composite image from each of continuously captured images, until a predetermined time has passed since an arbitrary image of the continuously captured images is captured or until a predetermined number of captured images has been processed, at least one composition-purpose image that is same as at least one composition-purpose image combined with the previous image may be arranged so as to have a same positional relation with the at least one subject in the current captured image as a positional relation between the at least one subject in the previous captured image and the at least one composition-purpose image combined with the previous captured image.

[8] In the image processing apparatus of [1], each subject may be a human face.

[9] According to another aspect of the invention, an imaging apparatus includes the image processing apparatus of any one of [1] to [9].

[10] According to further another aspect of the invention, an image processing method includes: detecting at least one subject in a captured image; judging arrangement of the at least one subject in the captured image by an arithmetic operation; selecting at least one composition-purpose image at random in accordance with the arrangement of the at least one subject; determining arrangement of the selected at least one composition-purpose image at random so that the at least one composition-purpose image does not overlap with one another and does not overlap with the detected at least one subject; and generating a composite image by combining the captured image with the at least one composition-purpose image.

[11] The image processing method of [10] may further include selecting a size for each of the at least one composition-purpose image to be arranged, at random from an image size range that is set in advance.

[12] The image processing method of any one of [10] to [11] may further include selecting an inclination for each of the at least one composition-purpose images to be arranged, at random from an image inclination range that is set in advance.

[13] In the image processing method of any one of [10] to [12], when the number of detected subject is two or more, the at least one composition-purpose image may be selected based on an arrangement relation between the detected subjects.

[14] In the image processing method of [13], the at least one composition-purpose image may be selected based on each distance between the subjects

[15] In the image processing method of any one of [10] to [14], when the composite image is generated from each of continuously captured images, if arrangement of the at least one subject in a current captured image is same as that of the at least one subject in a previous captured image, at least one composition-purpose image that is same as at least one composition-purpose image combined with the previous image may be arranged so as to have a same positional relation with the at least one subject in the current captured image as a positional relation between the at least one subject in the previous captured image and the at least one composition-purpose image combined with the previous captured image.

[16] In the image processing method of any one of [10] to [14], when the composite image is generated from each of continuously captured images, until a predetermined time has passed since an arbitrary image of the continuously captured images is captured or until a predetermined number of captured images has been processed, at least one composition-purpose image that is same as at least one composition-purpose image combined with the previous image may be arranged so as to have a same positional relation with the at least one subject in the current captured image as a positional relation between the at least one subject in the previous captured image and the at least one composition-purpose image combined with the previous captured image.

[17] In the image processing method of any one of [10] to [16], each subject may be a human face.

With the above configurations, while the arrangement of the at least one subject is judged and the at least one composition-purpose image used for image composition is selected at random based on information relating to the arrangement of the at least one subject, the selected at least one composition-purpose image can be arranged at random in a non-overlap manner in accordance with the arrangement of the at least one subject. There is a possibility that composition-purpose image(s) will overlap with the subject(s) when the composition-purpose image(s) is arranged at complete random relative to the captured image. Wit the above configurations, it is however possible to avoid that the subject(s) overlap with the composition-purpose image(s) because the arrangement of the composition-purpose image(s) is determined based on the arrangement of the subject(s). As a result, a composite image as a combination of the captured image and the composition-purpose images is displayed so as to be adapted to the scene of the captured image.

Moreover, a composite image giving surprise to a user can be generated at the time of image capturing because the composition-purpose image(s) are selected at random and arranged in accordance with the arrangement of the subject (s).

In addition, when image composition is applied to images that are captured continuously, if arrangement of the subject (s) in the current image is same as that of the subject(s) in the previous image, the composition-purpose image(s) that are same as the composition-purpose image(s) combined with the previous captured image can be arranged so as to have the same positional relation with the subject(s) in the current captured image as the positional relation between the subject (s) in the previous captured image and the composition-purpose image(s) combined with the previous captured image. Consequently, for example, display of a through image or a motion image becomes easy to view.

According to the invention, it is possible to provide an image processing apparatus, an image processing method and an imaging apparatus capable of generating a composite image matched with a location scene by combining a captured image with a composition-purpose image(s) based on at least one subject in the captured image.

DETAILED DESCRIPTION OF EMBODIMENTS OF THE INVENTION

Embodiments of the invention will be described below in detail with reference to the drawings.

Figure 1:
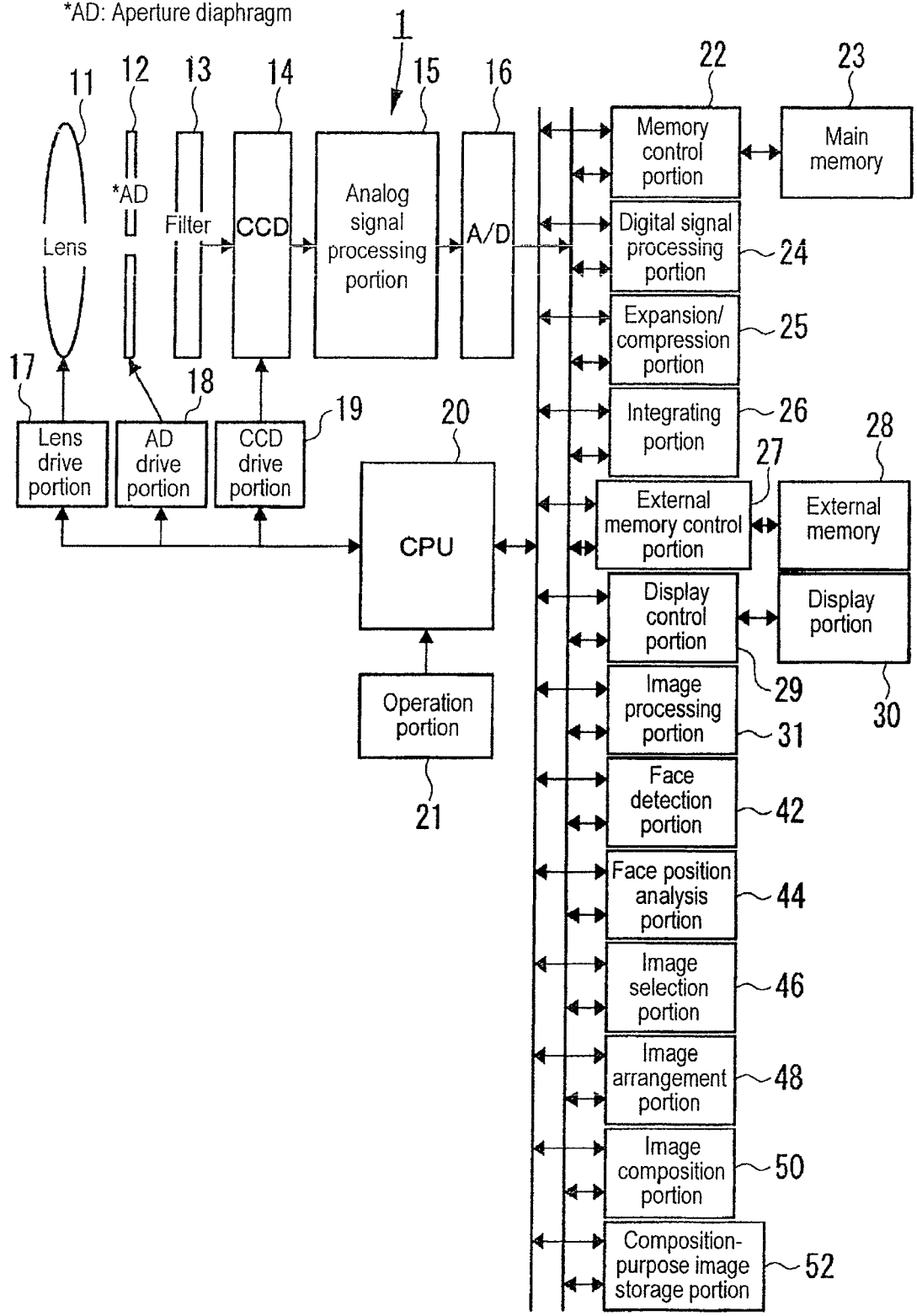
FIG. 1 is a block diagram showing an example of the configuration of an image processing apparatus and an imaging apparatus according to embodiments of the invention.

FIG. 1 is a block diagram showing an example of the configuration of an image processing apparatus and an imaging apparatus according to the embodiments of the invention. Although description in the following embodiments will be made with reference to the configuration of a digital camera by way of example, the image processing apparatus and the imaging apparatus according to the invention are not limited thereto particularly.

A digital camera 1 has an image capturing portion which captures an image of a subject. The image capturing portion has a lens 11, an aperture diaphragm 12, a filter 13, a solid-state imaging device (CCD) 14, an analog signal processing portion 15, and an A/D conversion portion 16. The solid-state imaging device 14 generates image data in accordance with incident light. The image data generated as an analog signal by the solid-state imaging device 14 is input to the analog signal processing portion 15. The A/D conversion portion 16 converts the processed analog signal into a digital signal. The image capturing portion further has a lens drive portion 17, an aperture diaphragm drive portion 18, and a CCD drive portion 19. The lens drive portion 17 drives the lens 11. The aperture diaphragm drive portion 18 drives the aperture diaphragm 12. The CCD drive portion 19 supplies a drive signal to the solid-state imaging device 14. The lens drive portion 17, the aperture diaphragm drive portion 18 and the CCD drive portion 19 are connected to a CPU 20. Although a configuration using a CCD as the imaging device is shown in this embodiment, the imaging device need not be particularly limited and a CMOS image sensor may be used as the imaging device.

An operation portion 21 that can be operated by a user at the time of image capturing is provided in the digital camera 1. The operation portion 21 is connected to the CPU 20.

Further, in the digital camera 1, a memory control portion 22, a digital signal processing portion 24, an expansion/compression portion 25, an integrating portion 26, an external memory control portion 27, a display control portion 29 and an image processing portion 31 are connected to the A/D conversion portion 16 and the CPU 20 via a bus. A main memory 23 is connected to the memory control portion 22. An external memory 28 is connected to the external memory control portion 27. A display portion 30 such as an LCD is connected to the display control portion 29 so that a captured image or a composite image generated by combining the captured image with composition-purpose images can be displayed.

The digital camera 1 according to this embodiment further has a face detection portion 42, a face position analysis portion 44, an image selection portion 46, an image arrangement portion 48, and an image composition portion 50. The face detection portion 42 serves as a subject detection unit that detects at least one predetermined subjects (e.g. human faces in this embodiment) in a captured image. The face position analysis portion 44 serves as a subject position analysis unit that judges arrangement of the subject(s) by an arithmetic operation. The image selection portion 46 serves as an image selection unit that selects a composition-purpose image(s) at random in accordance with the arrangement of the subject(s). The image arrangement portion 48 serves as an image arrangement unit that determines arrangement of the selected composition-purpose image(s) at random so that the composition-purpose images do not overlap with one another and do not overlap with the subject(s). The image composition portion 50 serves as an image composition unit that generates a composite image by combining the captured image with the composition-purpose image(s). The digital camera 1 according to this embodiment further has a composition-purpose image storage portion 52 that stores composition-purpose images in advance.

Figure 2:
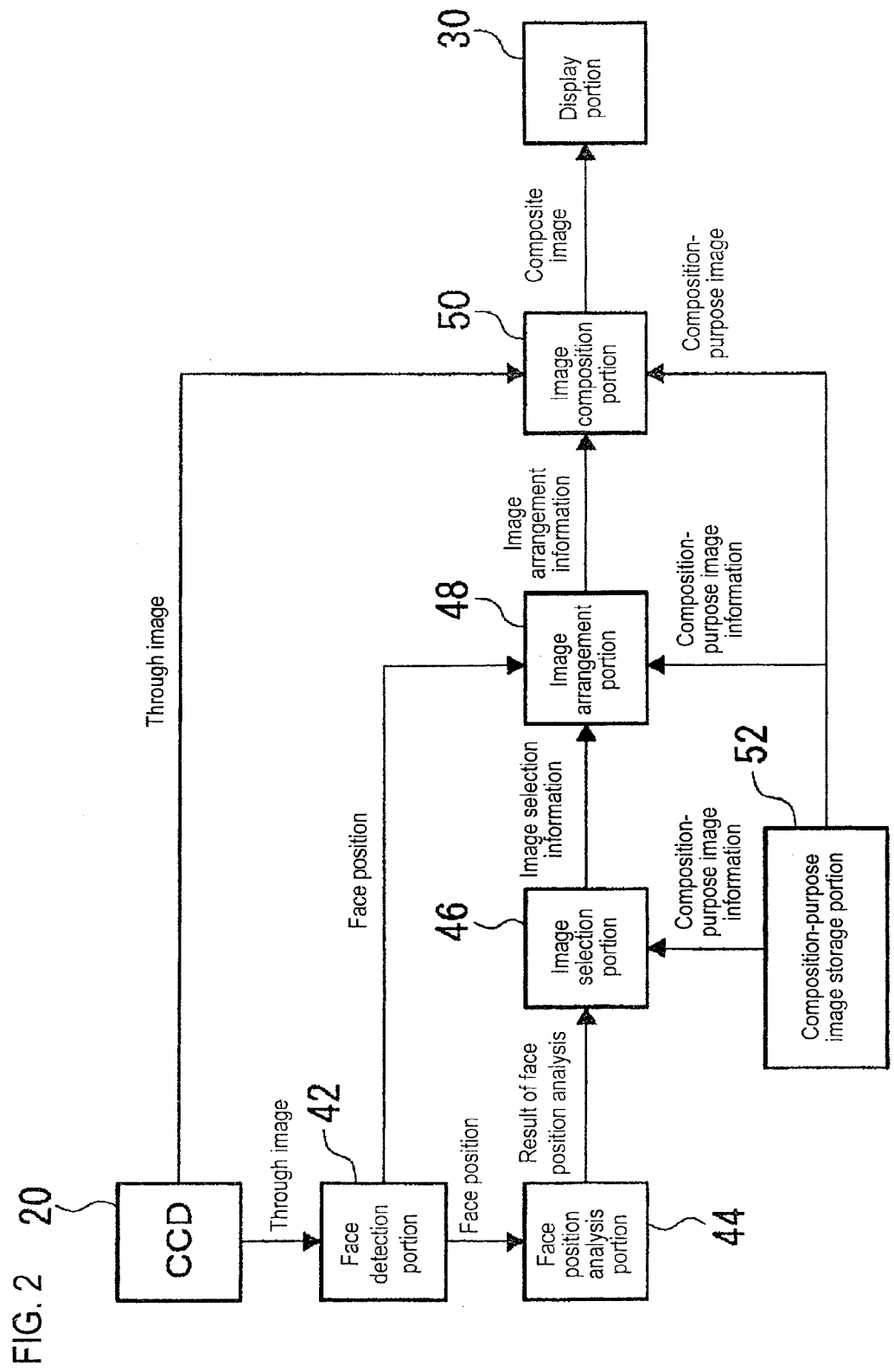
FIG. 2 is a block diagram showing control for combining a captured image with a composition-purpose image(s).

FIG. 2 shows a block diagram showing control for combining a captured image with a composition-purpose image (s). Information of a captured image (which may be a through image as shown in FIG. 2 or may be a still image) is generated by the CCD 14 at the time of image capturing. The captured image information is input both to the face detection portion 42 and to the image composition portion 50. The face detection portion 42 detects at least one desired subject from the captured image information. Although each subject detected in this embodiment is a human face, the subject is not limited thereto, and another material body or a whole human figure may be used as the subject. Information of a face position(s) detected by the face detection portion 42 is fed both to the face position analysis portion 44 and to the image arrangement portion 48.

The face position analysis portion 44 performs an arithmetic operation based on the face position information as to how the face position(s) is (are) arranged in the captured image, and feeds a result of the face position analysis to the image selection portion 46.

The image selection portion 46 selects a composition-purpose image(s) at random based on the result of the face position analysis. On this occasion, the composition-purpose image(s) are read from the composition-purpose image storage portion 52, which stores composition-purpose images that are set in accordance with arrangement of face positions in advance. The image selection portion 46 feeds image selection information to the image arrangement portion 48. The image arrangement portion 48 determines arrangement of the selected composition-purpose image(s) at random based on the face position information, the image selection information and the composition-purpose image(s) provided from the composition-purpose image storage portion 52 so that the selected composition-purpose image(s) do not overlap with one another and do not overlap with the subject face(s). The image arrangement portion 48 feeds the determined arrangement of the composition-purpose image(s) as image arrangement information to the image composition portion 50.

The image composition portion 50 generates a composite image by combining the captured image with the composition-purpose image(s) based on the captured image provided from the CCD, the image arrangement information provided from the image arrangement portion 48 and the composition-purpose image(s) provided from the composition-purpose image storage portion 52. The image composition portion 50 outputs the composite image to the display portion 30, so that the composite image is displayed on the display portion 30.

Figure 3:
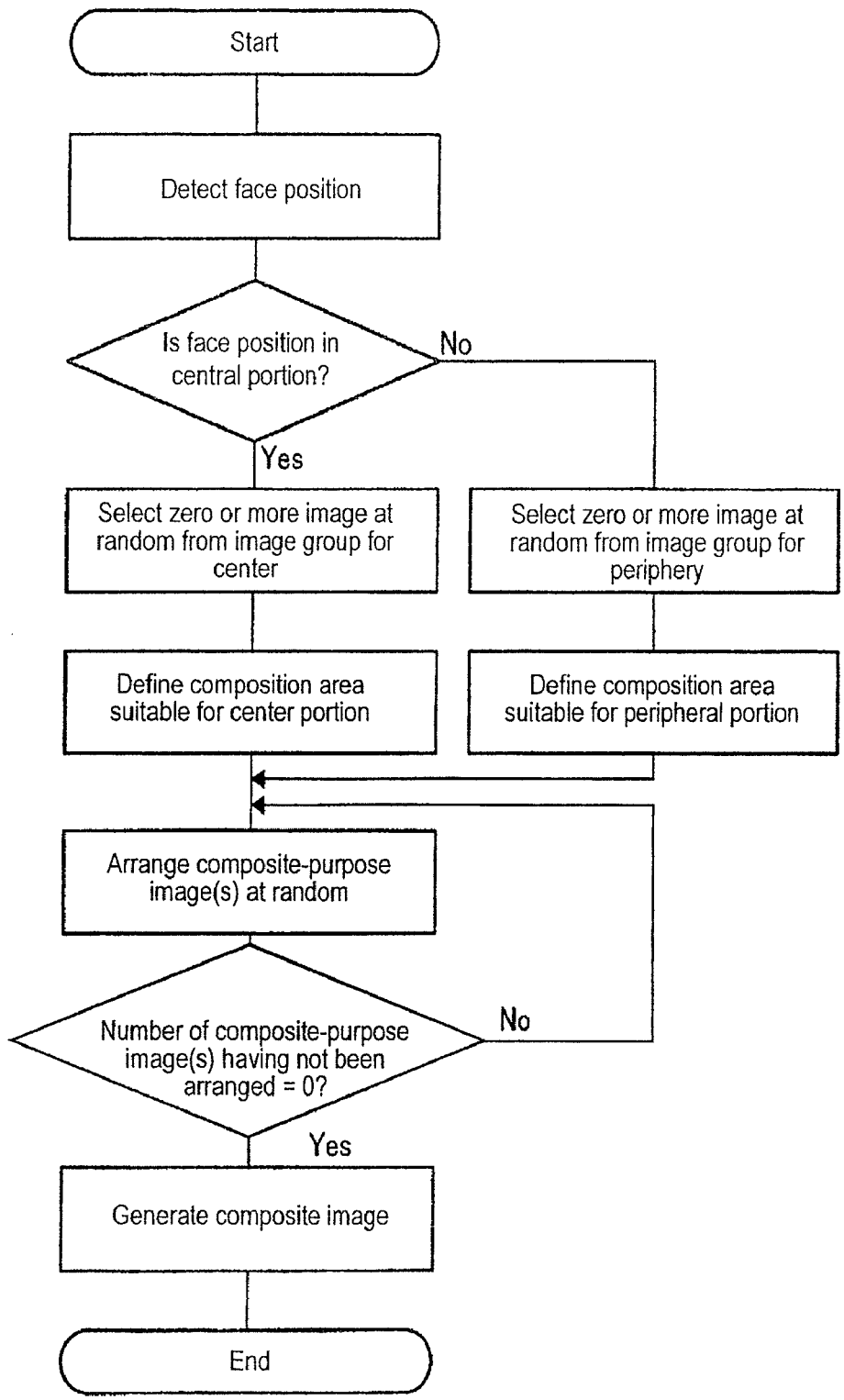
FIG. 3 is a flow chart showing a processing procedure according to a first embodiment of the invention.

A procedure of image processing according to the embodiments of the invention will be described below with reference to the drawings. FIG. 3 is a flow chart showing the procedure of image processing according to a first embodiment of the invention.

Figure 4A:
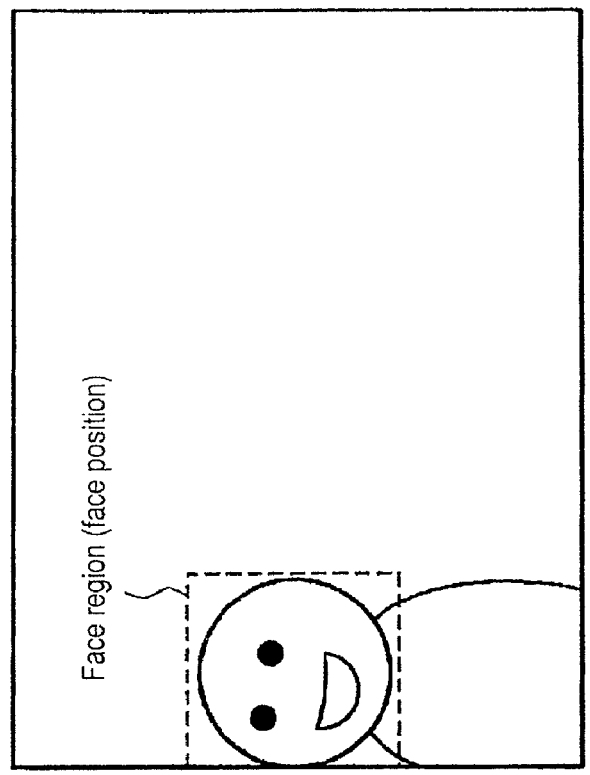
FIGS. 4A and 4B are views each showing a state where detection of a face position is performed.
Figure 4B:
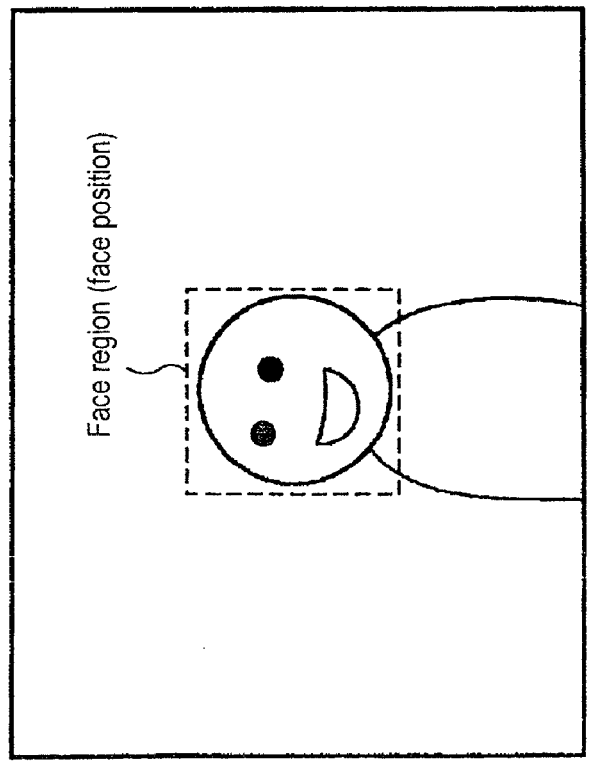

First, a face position is detected from an acquired captured image. Each of FIGS. 4A and 4B shows a state where detection of a face position is performed. FIG. 4A shows a state where the face position is in a central portion of the captured image. FIG. 4B shows a state where the face position is in a peripheral portion of the captured image. Incidentally, in each of FIGS. 4A and 4B, the face position is shown as a region surrounded by the broken line. After detection of the face position, judgment is made as to whether the face position is in the center or not.

Figure 5A:
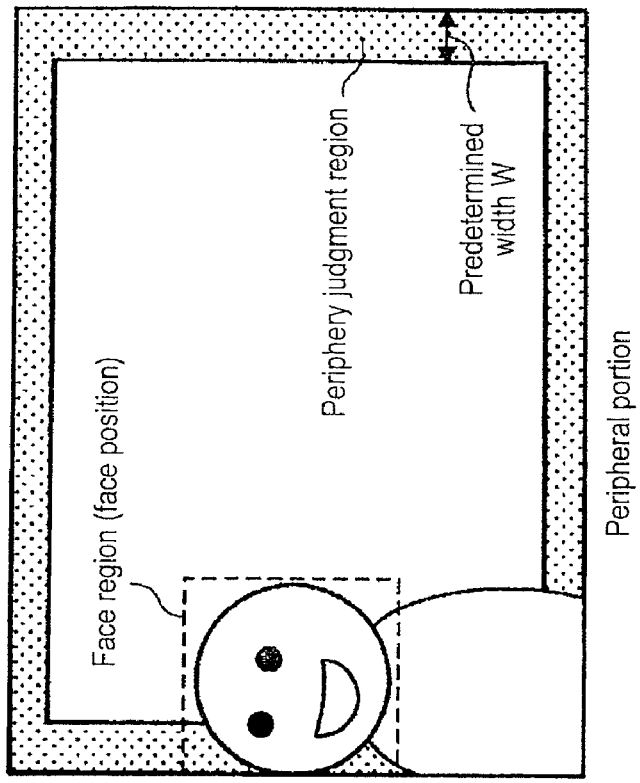
FIGS. 5A and 5B are views each showing a state where judgment of the face position is performed.
Figure 5B:
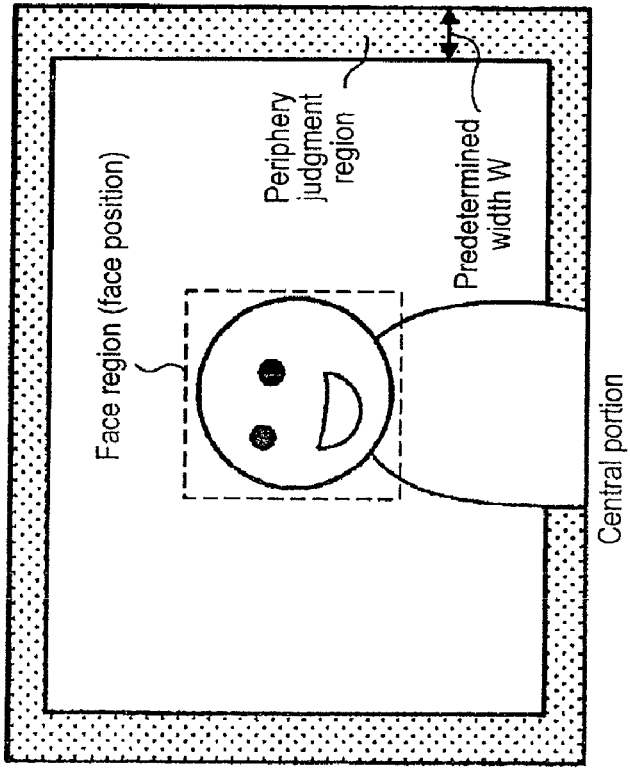

Each of FIGS. 5A and 5B shows a state where the face position is judged. FIG. 5A shows a state where the face position is in the center of the captured image. FIG. 5B shows a state where the face position is in the periphery of the captured image. Incidentally, in each of FIGS. 5A and 5B, the face position is shown as a region surrounded by the broken line.

As a specific example of the face position judgment, a periphery judgment region having a predetermined width W from the peripheral end of the captured image is set as shown in each of FIGS. 5A and 5B, so that the face position overlapping with the periphery judgment region can be judged to be in the periphery while the face position not overlapping with the periphery judgment region can be judged to be in the center.

Figure 6A:
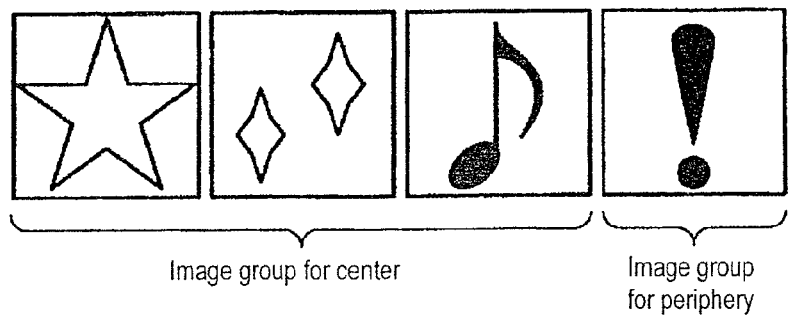
FIGS. 6A and 6B are views each showing an example of composition-purpose images.
Figure 6B:
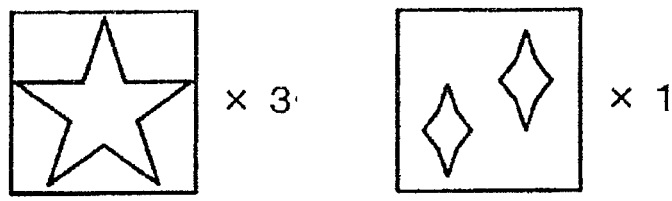

Then, zero or more appropriate images are selected at random from composition-purpose images that are set in advance, based on the judged face position. FIG. 6A is a view showing an example of composition-purpose images. FIG. 6B is a view showing the number of repetitions of each selected composition-purpose image. 'Zero or more' means that there may be the case where no composition-purpose image is selected, that is, the case where image composition is not performed. As shown in FIG. 6A, composition-purpose images are prepared in a state where the composition-purpose images are separated into an image group for the center and an image group for the periphery. Zero or more appropriate images are selected at random based on the face position judgment. Images captured in advance or images acquired from the outside in advance may be used as the composition-purpose images. In selection of the composition-purpose image(s), one composition-purpose image may be selected repeatedly as shown in FIG. 6B or no composition-purpose image may be selected. In addition, the user may set the maximum limit of the number of selected composition-purpose images in advance so that composition-purpose images not larger than the maximum limit are selected.

Figure 7A:
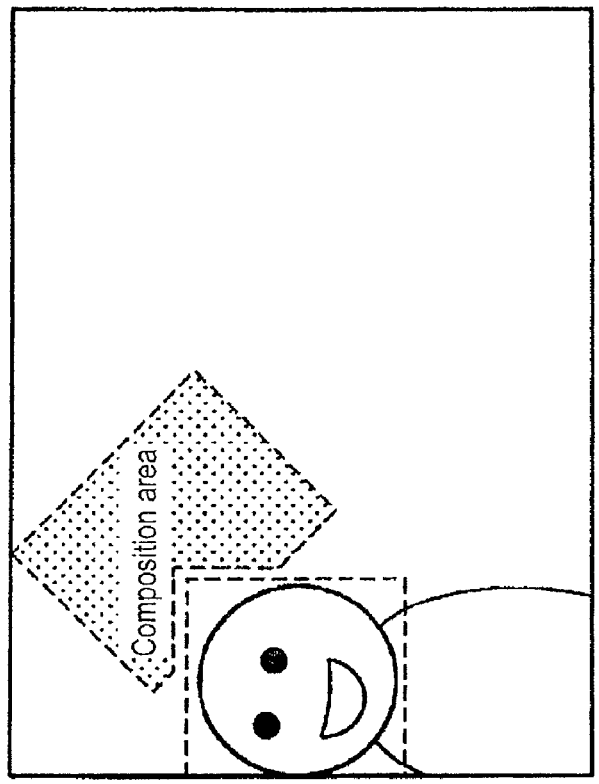
FIGS. 7A and 7B are views each showing a state where a composition area is set in a captured image.
Figure 7B:
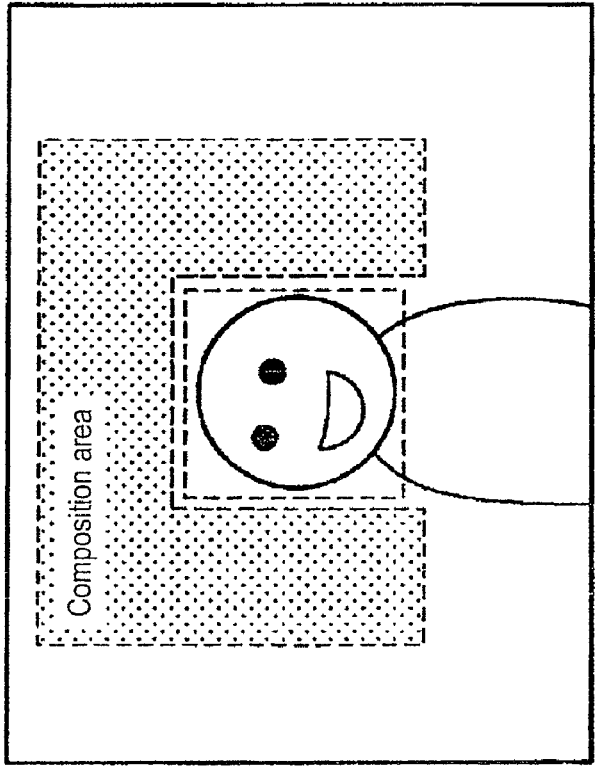

After selection of the composition-purpose image(s), an appropriate composition area is set based on the face position judgment. Each of FIGS. 7A and 7B shows a state where a composition area is set in the captured image. FIG. 7A shows a state where a composition area is set when the face position is in the center of the captured image. FIG. 7B shows a state where a composition area is set when the face position is in the periphery of the captured image. As shown in FIGS. 7A and 7B, in this embodiment, the position and shape of the composition area are set in accordance with the face position. Although the shape of the composition area is arbitrary, a region not overlapping with the subject (face position) is set as the composition area in this embodiment.

Figure 8A:
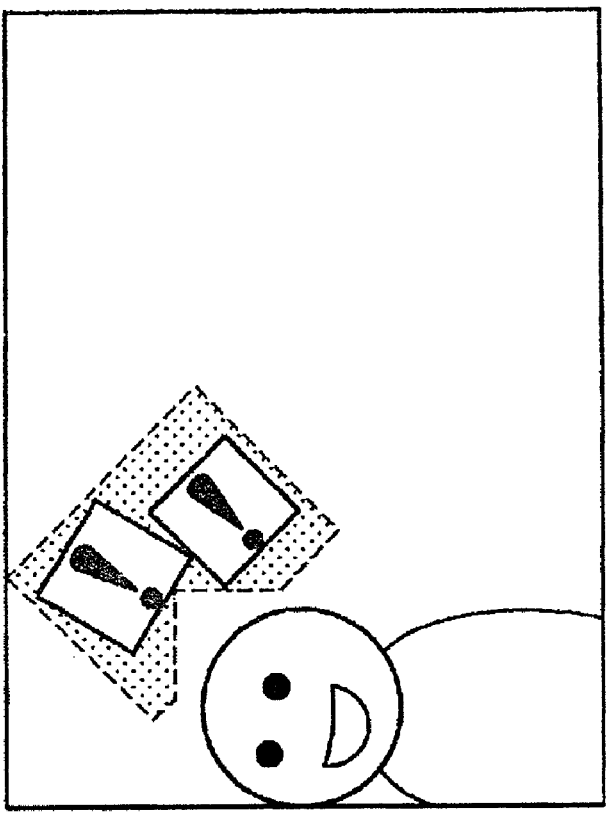
FIGS. 8A and 8B are views each showing a state where composition-purpose images are arranged in the composition area.
Figure 8B:
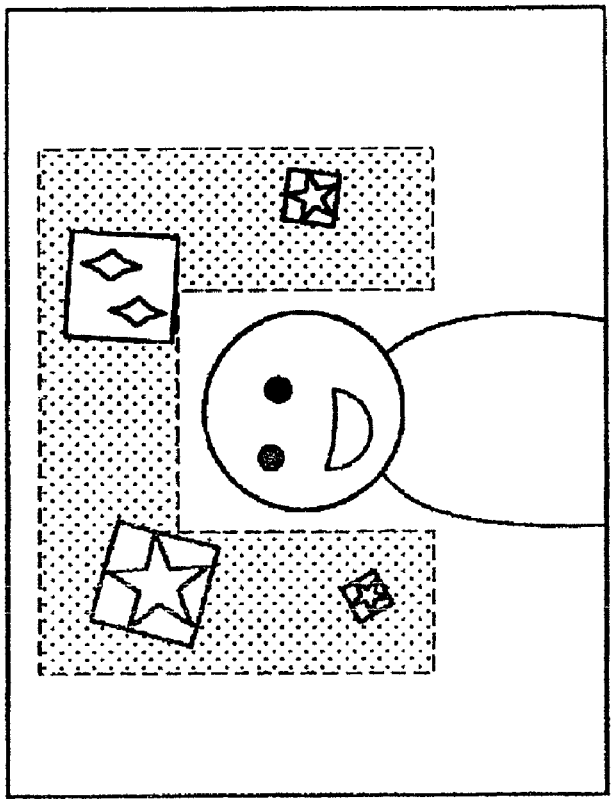

Successively, a composition-purpose image(s) are arranged one by one at random in the set composition area. Each of FIGS. 8A and 8B shows a state where composition-purpose images are arranged in the composition area. FIG. 8A shows a state where composition-purpose images are arranged in the composition area when the face position is in the center of the captured image. FIG. 8B shows a state where composition-purpose images are arranged in the composition area when the face position is in the periphery of the captured image. The position, size and direction of each composition-purpose image are determined at random but the arrangement of a composition-purpose image(s) is selected so that the composition-purpose image(s) are disposed in the composition area and do not to overlap with one another.

Figure 9:
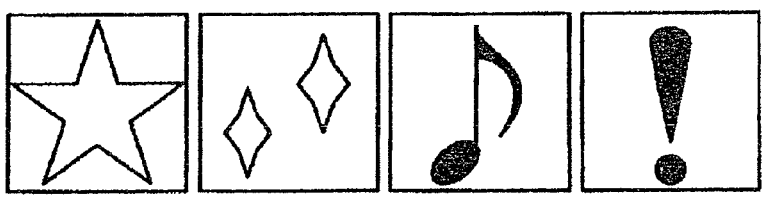
FIG. 9 is a view showing a state where a size and inclination of each composition-purpose image are set.
Figure 10B:
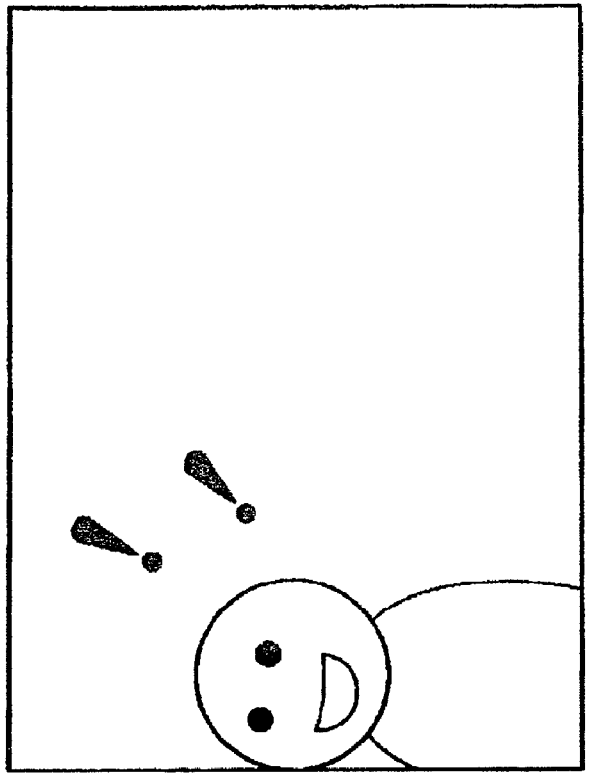
FIGS. 10A and 10B are views each showing an example of the composite image generated by the processing according to the first embodiment.
Figure 10A:
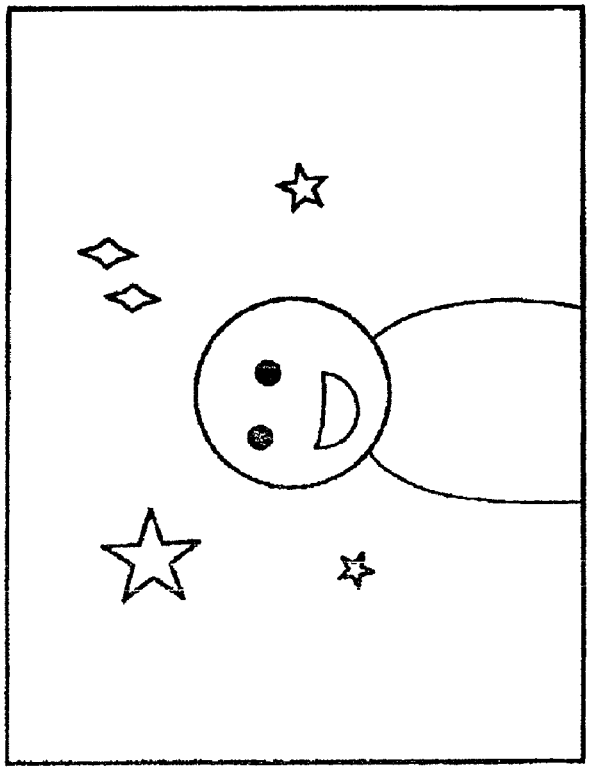

FIG. 9 shows a state where the size and inclination are set for each composition-purpose image. Each of FIGS. 10A and 10B shows a state where composition-purpose images are combined with a captured image. FIG. 10A shows a state where composition-purpose images are combined with a captured image when the face position is in the center of the captured image. FIG. 10B shows a state where composition-purpose images are combined with a captured image when the face position is in the periphery of the captured image. As shown in FIG. 9, a size range of from a 'minimum size' to a 'maximum size' is defined for each composition-purpose image so that the size of each composition-purpose image can be selected at random from the size range. In this manner, the size of each composition-purpose image can be prevented from becoming too small to view or too large unnaturally after each composition-purpose image is combined with the captured image. With respect to the direction of each composition-purpose image, an inclination range (e.g. from $-30°$ to $+30°$) of each composition-purpose image with respect to the captured image is defined in the same manner as described above so that each composition-purpose image is prevented from being arranged in an unnatural direction relative to a scene of the captured image.

When all the predetermined composition-purpose images are arranged and a composite image is generated by combining the captured image with all the arranged composition-purpose images, processing according to this embodiment is terminated. Execution of the aforementioned image processing permits appropriate composition-purpose images to be combined with the captured image in appropriate arrangement in accordance with the arrangement of the subject.

Figure 11:
FIG. 11 is a view showing a composite image generated without execution of the processing according to the first embodiment.

FIG. 11 is a view showing a composite image generated without execution of the processing according to this embodiment. This embodiment can avoid that the composition-purpose images overlap with the subject as in the case where the composition-purpose images are arranged completely at random relative to the captured image as shown in FIG. 11. This is because the composition-purpose images to be combined with the captured image are selected at random based on the subject arrangement information obtained by judgment of the arrangement of the subject (face) and are arranged at random in accordance with the arrangement of the subject so as not to overlap with one another and with the subject. According to this embodiment, the subject arrangement information is used for selection of the composition-purpose images and for determination of composition positions of the composition-purpose images so that the composition-purpose images are selected and arranged not completely at random but with certain qualifications based on the arrangement of the subject. Accordingly, because the arrangement of the composition-purpose images is determined based on the arrangement of the subject, it can be avoided that the composition-purpose images overlap with the subject. Therefore, the resulting composite image can be displayed so as to be adapted to a scene of the captured image.

In addition, when the face position protrudes from a frame of the captured image as shown in FIG. 10B, a display different from that in the case where the face position is in the center (see FIG. 10A) can be made to call attention to the user.

Figure 12:
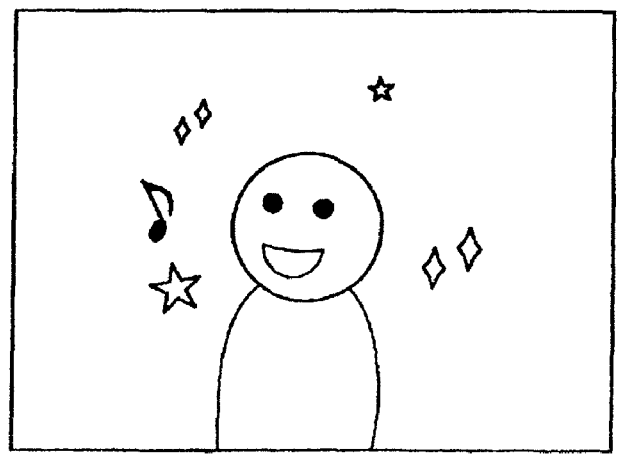
FIG. 12 is a view showing another example of the composite image generated by the processing according to the first embodiment.

FIG. 12 is a view showing another example of a composite image generated by the processing according to this embodiment. Because the selected composition-purpose images are random in terms of arrangement, number and type, the resulting composite image varies whenever an unchanged scene is captured. For example, even if the same scene as in FIG. 10A in which the face position is in the center is captured again in precisely the same condition, there is a possibility that a composite image having arrangement of composition-purpose images different from those in the composite image shown in FIG. 10A may be obtained as shown in FIG. 12. In this manner, the resulting composite image varies for respective image capturings, so that the user can enjoy unexpected image capturing.

Incidentally, this embodiment is only exemplary and can be modified appropriately. For example, the same processing may be applied to another subject than a face. Although this embodiment has been described on the case where only a position of a face in the arrangement of the subject is used as a criterion for selection of a composition-purpose image(s) and definition of a composition area, the size and direction of the face may be used as a criterion for selection of the composition-purpose images and definition of the composition area. Although this embodiment has been described on the case where the composition area is defined before the composition-purpose image(s) are arranged in the composition area, the same effect can be obtained also in the case where judgment is made as to whether the arrangement of the composition-purpose image(s) is appropriate after the composition-purpose image(s) are arranged without definition of the composition area so that the composition-purpose images are rearranged when the arrangement of the composition-purpose image(s) is not appropriate. Accordingly, the procedure of defining the composition area in this embodiment is not an essential process.

A second embodiment of the invention will be described below with reference to the drawings.

Figure 13:
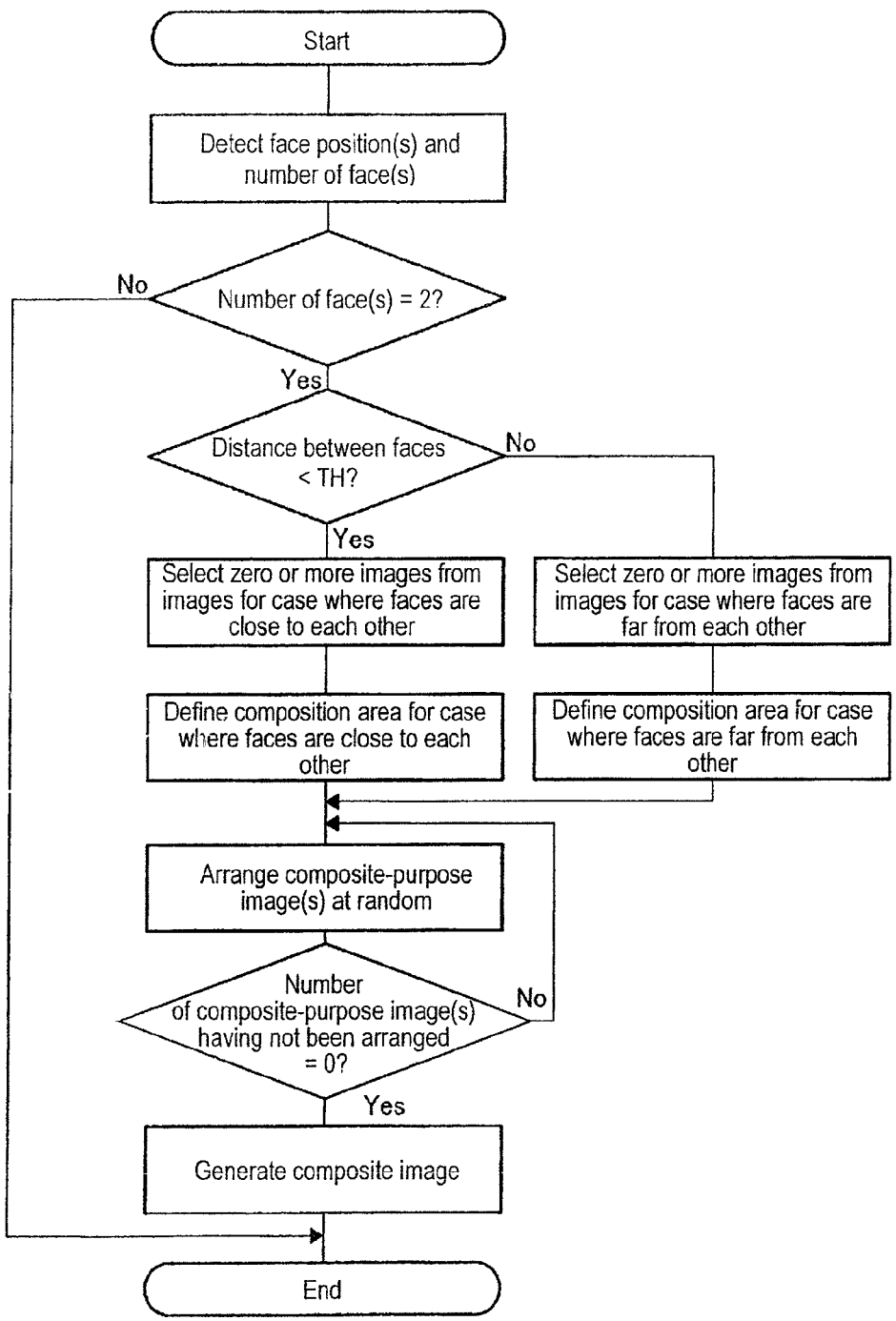
FIG. 13 is a flow chart showing a processing procedure according to a second embodiment of the invention.

FIG. 13 is a flow chart showing a processing procedure according to this embodiment. In this embodiment, processing is performed while not only arrangement of one subject but also a relation between subjects is taken into consideration.

Figure 14A:
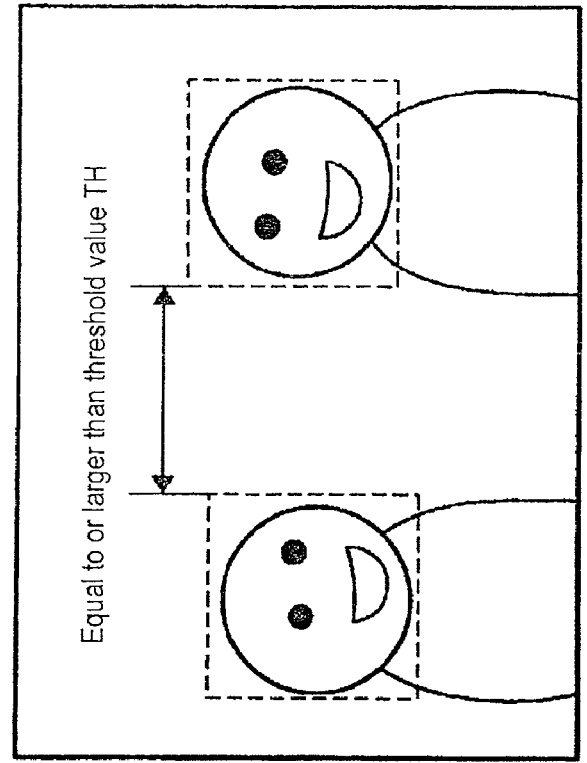
FIGS. 14A and 14B are views each showing a state where judgment relating to a positional relation between subjects is performed.
Figure 14B:
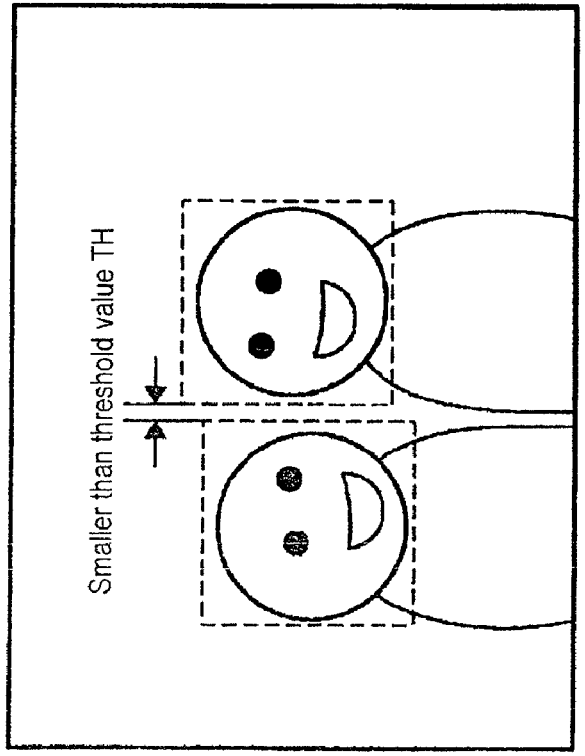

First, positions of faces and the number of the faces are detected from a captured image. Each of FIGS. 14A and 14B shows a state where two faces are in a captured image. FIG. 14A shows a state where the faces are close to each other. FIG. 14B shows a state where the faces are far from each other. Then, judgment is made as to whether the number of faces is two or not. If the number of faces is not equal to two, processing is terminated. If the number of faces is equal to two, judgment is further made as to whether or not a distance between the faces is smaller than a threshold TH. For example, the threshold TH is a value that is determined based on the sizes of the two faces. For example, an average of the widths of the two faces may be defined as the threshold TH.

Figure 15:
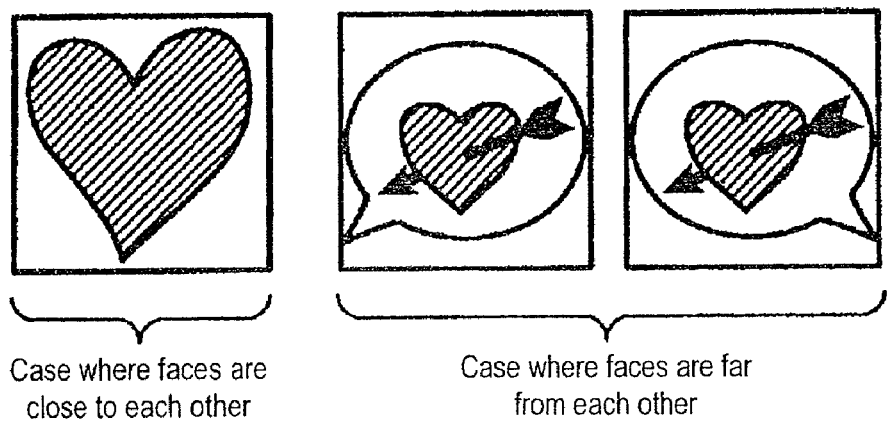
FIG. 15 is a view showing examples of the composition-purpose images.

Then, zero or more appropriate images are selected at random from composition-purpose images that are set in advance, based on a result of the judgment as for the distance between the faces. FIG. 15 is a view showing an example of composition-purpose images. As shown in FIG. 15, composition-purpose images for the close distance between the faces and composition-purpose images for the far distance between the faces are prepared separately in advance. Zero or more images are selected at random from appropriate images in accordance with the face distance judgment. Incidentally, in this embodiment, one composition-purpose image may be selected repeatedly or no composition-purpose image may be selected, similarly to the aforementioned embodiment. In addition, the maximum number of repetitions of each composition-purpose image may be set in advance so that each composition-purpose image can be selected so repeatedly that the number of repetitions of each image does not exceed the maximum number.

Figure 16A:
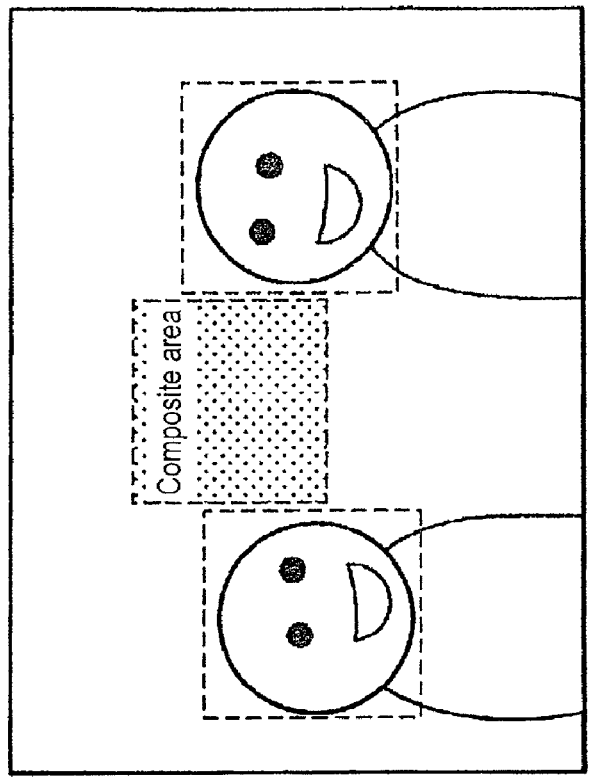
FIGS. 16A and 16B are views each showing a state where a composition area is set in a captured image.
Figure 16B:
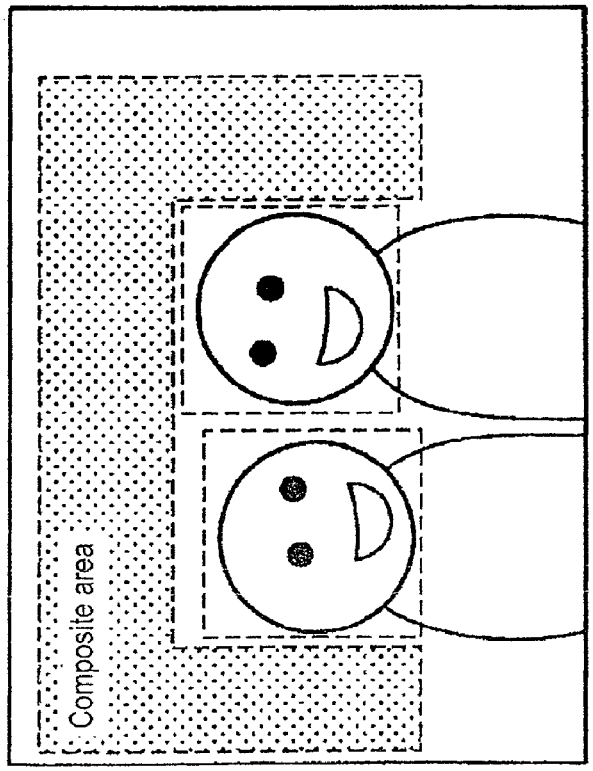

Then, an appropriate composition area is set based on the face distance judgment. Each of FIGS. 16A and 16B is a view showing a state where a composition area is set in the captured image. FIG. 16A shows a state where a composition area is set when the faces are close to each other. FIG. 16B shows a state where a composition area is set when the faces are far from each other. Incidentally, the shape of the composition area is arbitrary but a region not overlapping with subjects (face regions) is set as the composition area in this embodiment.

Figure 17B:
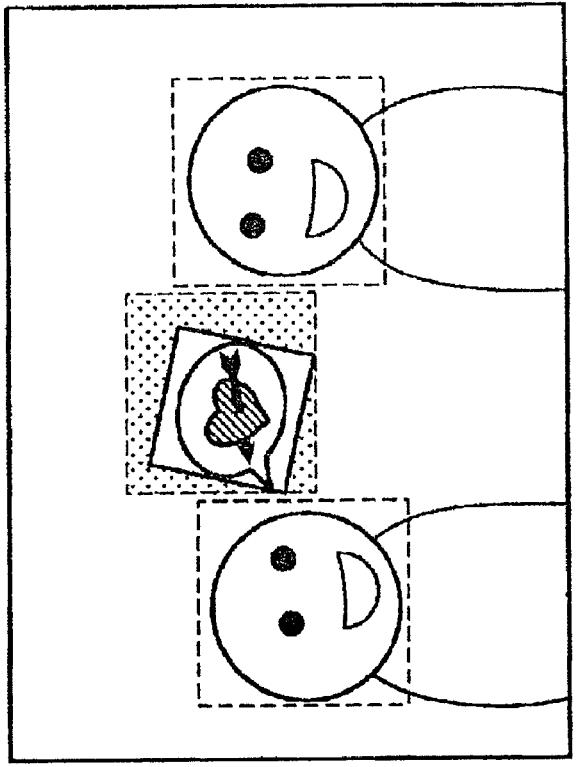
FIGS. 17A and 17B are views each showing a state where each composition-purpose image is arranged in a composition area.
Figure 17A:
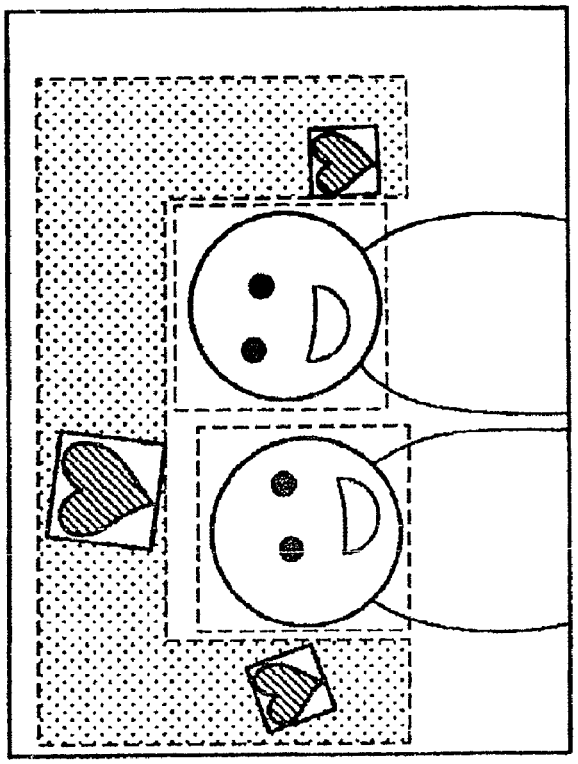

Successively, the composition-purpose image(s) are arranged one by one at random in the composition area. Each of FIGS. 17A and 17B is a view showing a state where each composition-purpose image is arranged in the composition area. FIG. 17A shows a state where the composition-purpose images are arranged in the composition area when the faces are close to each other. FIG. 17B shows a state where the composition-purpose image is arranged in the composition area when the faces are far from each other. The positions, sizes and directions of the composition-purpose images are arbitrary but arrangement of the composition-purpose images is selected so that the composition-purpose images are put in the composition area and do not overlap with one another. As shown in FIG. 9, a size range of from a 'minimum size' to a 'maximum size' is defined for each composition-purpose image. The size of each composition-purpose image is selected at random from the size range so that each composition-purpose image can be prevented from becoming too small to view or too large unnaturally. With respect to the direction of each composition-purpose image, an inclination range of each composition-purpose image with the captured image is defined in the same manner as described above so that each composition-purpose image having an orientation can be prevented from being arranged in an unnatural direction. When a composite image is generated by combining the captured image with all the arranged composition-purpose images, the processing according to this embodiment is terminated.

Figure 18B:
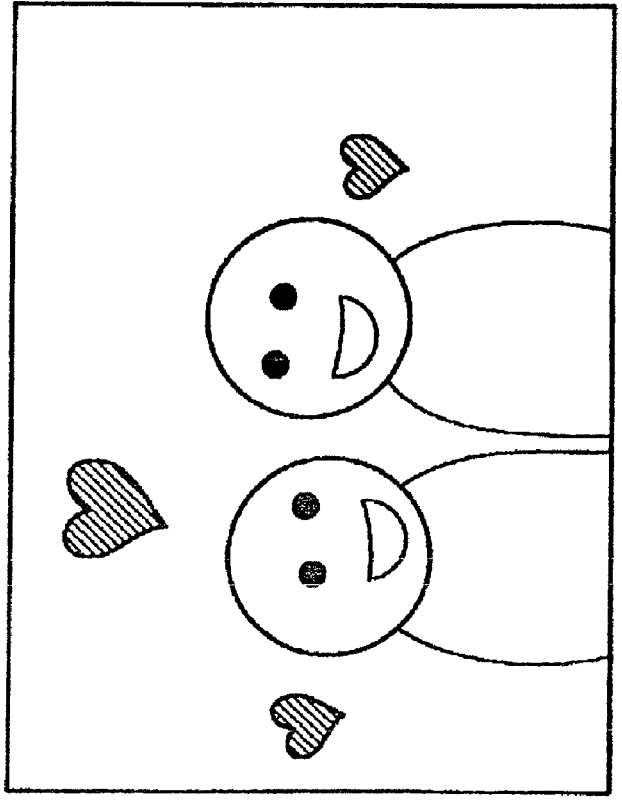
FIGS. 18A and 18B are views each showing an example of the composite image generated by the processing according to the second embodiment.
Figure 18A:
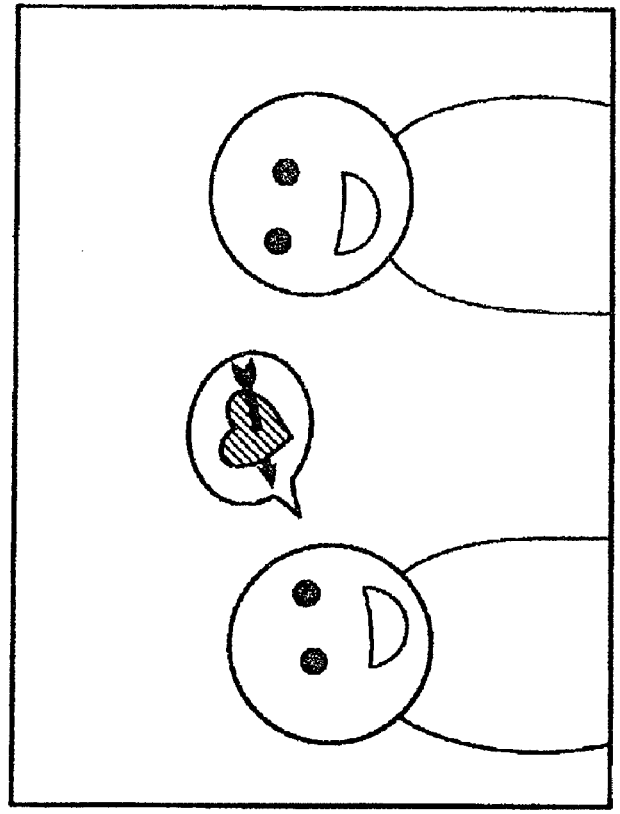

Each of FIGS. 18A and 18B is a view showing an example of the composite image generated by the processing according to this embodiment. FIG. 18A shows a state where the composition-purpose images are combined with the captured image when the faces are close to each other. FIG. 18B shows a state where the composition-purpose image is combined with the captured image when the faces are far from each other.

Figure 19:
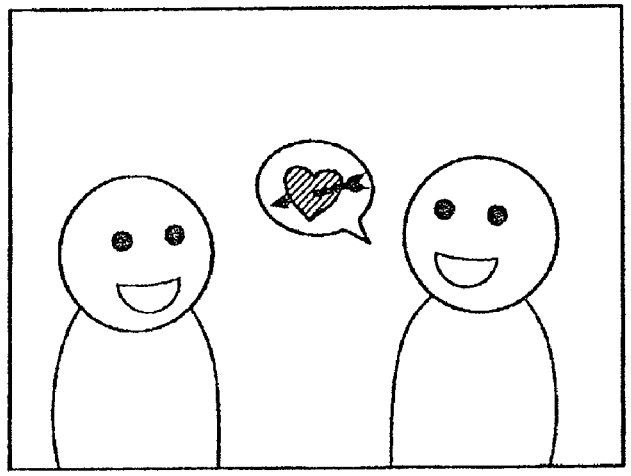
FIG. 19 is a view showing another example of the composite image generated by the processing according to the second embodiment.

In this embodiment, the captured image is combined with each appropriate composition-purpose image arranged appropriately in accordance with the relation in arrangement between the subjects. Accordingly, because the captured image is combined with each of the predetermined composition-purpose images, which are individually provided for (i) the case where the faces are close to each other (FIG. 18A) and (ii) the case where the faces are far from each other (FIG. 18B), display having difference visual effects can be made. Moreover, because each selected composition-purpose image is random in terms of arrangement, number and type, the resulting composite image varies whenever an unchanged scene is captured. For example, even if the same scene as in FIG. 18B in which the faces are far from each other is captured again in the same condition, there is a possibility that a composite image as shown in FIG. 19 may be obtained. In this manner, the different composite images are generated for respective image capturings, so that the user can enjoy unexpected image capturing.

Incidentally, the procedure in this embodiment is only exemplary and, for example, the same processing may be applied to other subjects than faces. Although this embodiment has been described on the case where only the relation in position between the faces in the arrangement of the subjects is used as a criterion for selection of the composition-purpose images and definition of the composition area, the relation in size and direction between the faces may be used as a criterion for selection of the composition-purpose images and definition of the composition area. Although this embodiment has been described on the case where the composition area is defined before the composition-purpose images are arranged in the composition area, the same effect as that in this embodiment can be obtained also in the case where judgment is made as to whether the arrangement of the composition-purpose images is appropriate after the composition-purpose images are arranged without definition of the composition area so that the composition-purpose images are rearranged when the arrangement of the composition-purpose images is not appropriate. Accordingly, the procedure of defining the composition area in this embodiment is not an essential process.

Figure 20:
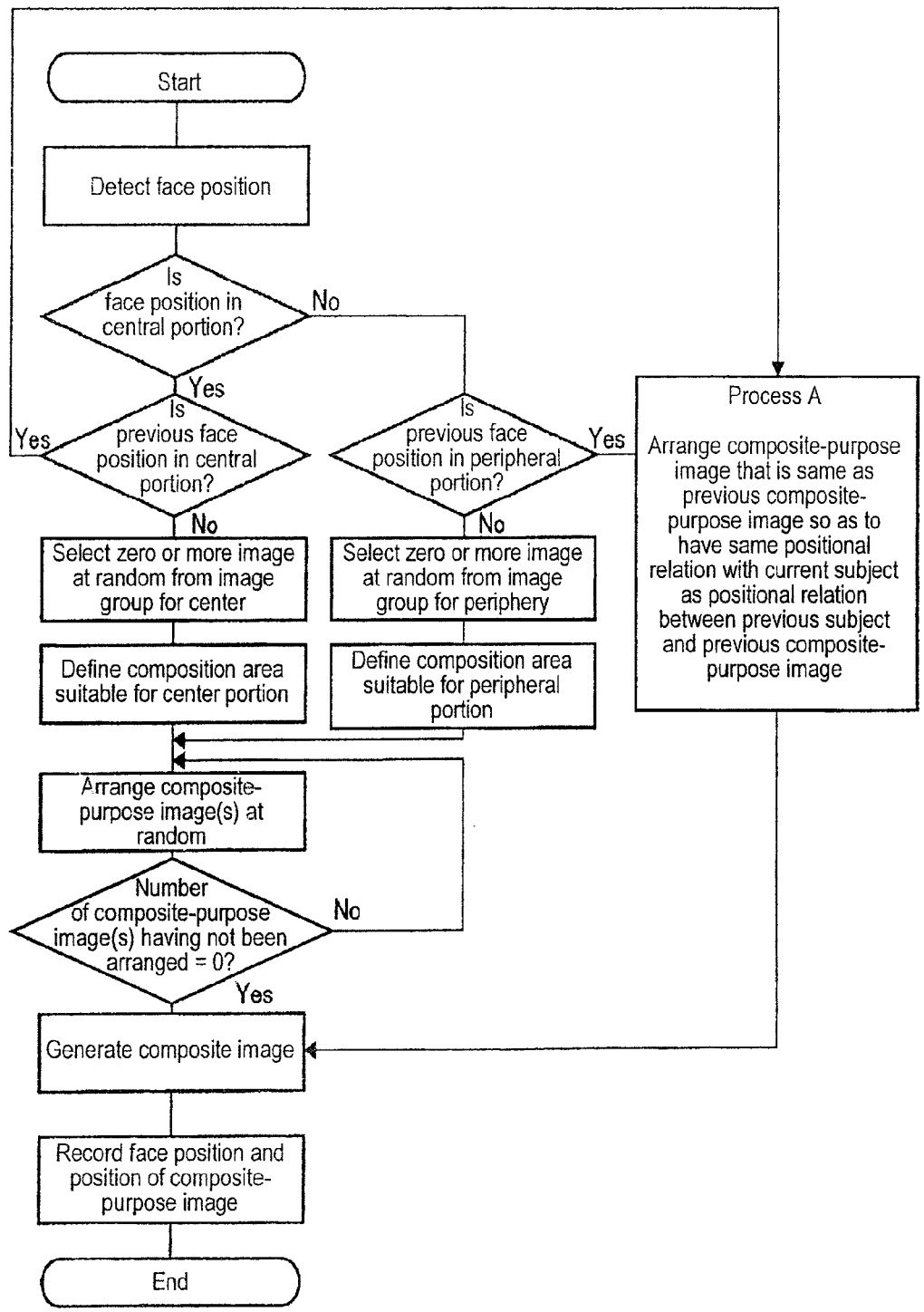
FIG. 20 is a flow chart showing a processing procedure according to a third embodiment of the invention.

A third embodiment of the invention will be described below with reference to the drawings. FIG. 20 is a flow chart showing a processing procedure according to this embodiment. An example of composition processing that is applied to continuously captured images will be described in this embodiment.

As shown in FIG. 20, the step of detecting a face position, the step of judging the arrangement of the face position by an arithmetic operation, the step of selecting a composition-purpose image(s) at random in accordance with the arrangement of the subject and the step of determining the arrangement of the selected composition-purpose image(s) at random so that the composition-purpose image(s) do not overlap with one another and do not overlap with the subject are the same as in the first embodiment.

In this embodiment, when a composition-purpose image(s) are combined with continuously captured images by referring to the arrangement of the subject in a previous frame. If the arrangement of the subject is unchanged, the same composition-purpose image(s) as those are used for the previous frame are arranged and combined to obtain the same positional relation as a positional relation between the subject in the previous frame and the composition-purpose image(s) used for the previous frame.

Figure 21A:
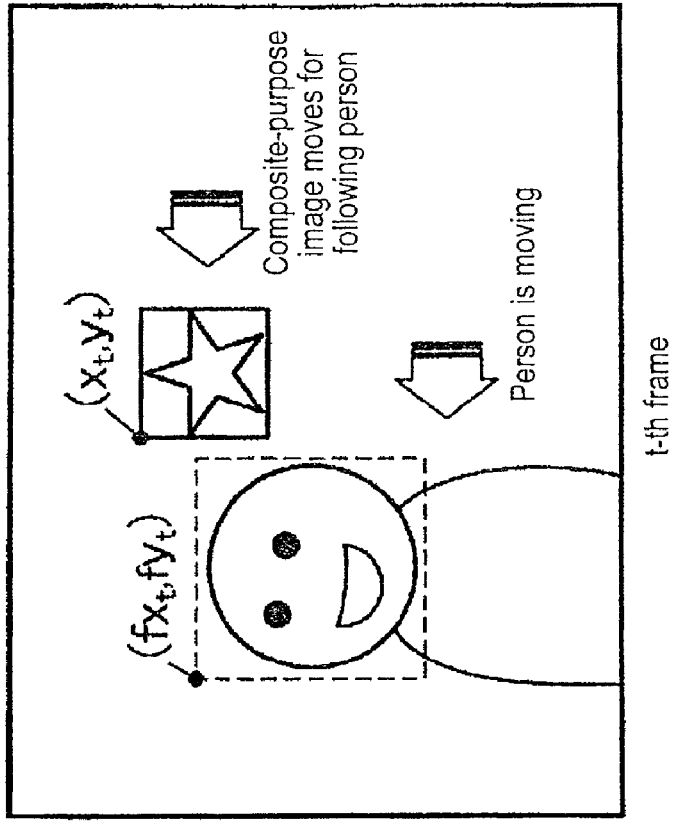
FIGS. 21A and 21B are views for explaining a state where each composition-purpose image follows the subject in continuous frames.
Figure 21B:
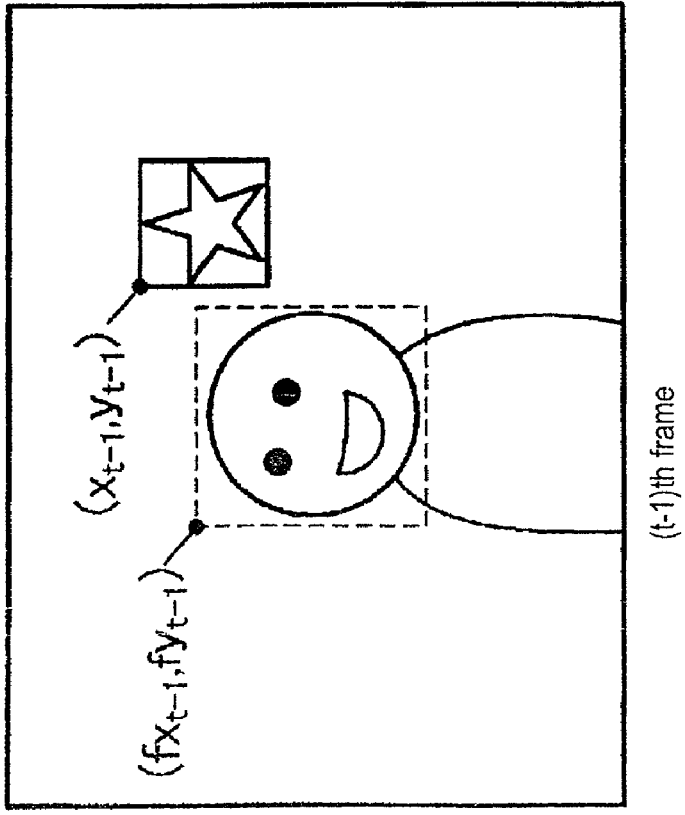

FIGS. 21A and 21B are views for explaining continuously captured images. FIG. 21A shows a captured image in a previous frame. FIG. 21B shows a captured image in a current frame following the captured image shown in FIG. 21A. The current frame to be processed is referred to as t-th frame while the previous frame is referred to as (t−1)th frame. As shown in FIG. 20, after the face position is analyzed to judge as to whether the face position is in the center or in the periphery of the captured image, the face position in the (t−1)th frame is referred to. If the face position in the (t−1)th frame coincides with the face position in the t frame, a 'process A' is performed. When the face position in the t−1 frame does not coincide with the face position in the t-th frame, the same process as in the first embodiment is performed. Incidentally, the face position in the first frame of continuously captured images is always judged to be not coincident with that in the previous frame because there is no frame previous to the first frame.

In the process A, the same composition-purpose image(s) as those used for generating the composite image of the (t−1)-th frame are arranged to obtain a positional relation equivalent to a positional relation between the face in the (t−1)th frame and the composition-purpose image(s) in the (t−1)th frame. Specifically, the coordinates $(x_t, y_t)$ of each composition-purpose image in the t-th frame is calculated by the following expression (1) using the face position $(fx_t, fy_t)$, the composition position $(x_{t-1}, y_{t-1})$ and the face position $(fx_{t-1}, fy_{t-1})$ in the (t−1)th frame.

$$x_t = fx_t + (x_{t-1} - fx_{t-1})$$

$$y_t = fy_t + (y_{t-1} - fy_{t-1}) \quad (1)$$

As shown in FIGS. 21A and 21B, the positional relation between the face and the composition-purpose image in the t-th frame is equivalent to the positional relation between the face and the composition-purpose image in the (t−1)th frame. Incidentally, the position of the face and the position of the composition-purpose image are expressed by the coordinates of left upper points of respective regions of the face and the composition-purpose image. Because the positional relation is kept constant, the composition-purpose image moves following the subject even if the subject moves between the frames.

After a composite image is generated, the face position and the position of each composition-purpose image are recorded on a recording portion or the like. This is because the face position and the position of each composition-purpose image are required for processing a next frame.

Incidentally, this embodiment is only exemplary and can be modified appropriately. For example, it is thought of that the same processing is applied to another subject than the face. Although this embodiment has been described on the case where processing is performed so that only the positional relation between the face as the arrangement of the subject and each composition-purpose image is kept constant, it is preferable that the size and direction of each composition-purpose image are processed in the same manner as described above. Moreover, when there are plural subjects, the relation between the subjects may be analyzed in the same processing as described above based on judgment as to whether or not the relation in the current frame is equivalent to the relation in the previous frame.

Although this embodiment has been described on the case where the absolute position of the subject and the absolute position of each composition-purpose image are recorded so as to be referred to for processing the next frame, the same effect as described above can be obtained also in the case where a result of analysis of the arrangement of the subject and the position of each composition-purpose image relative to the subject are used.

A fourth embodiment of the invention will be described below with reference to the drawings.

Figure 22:
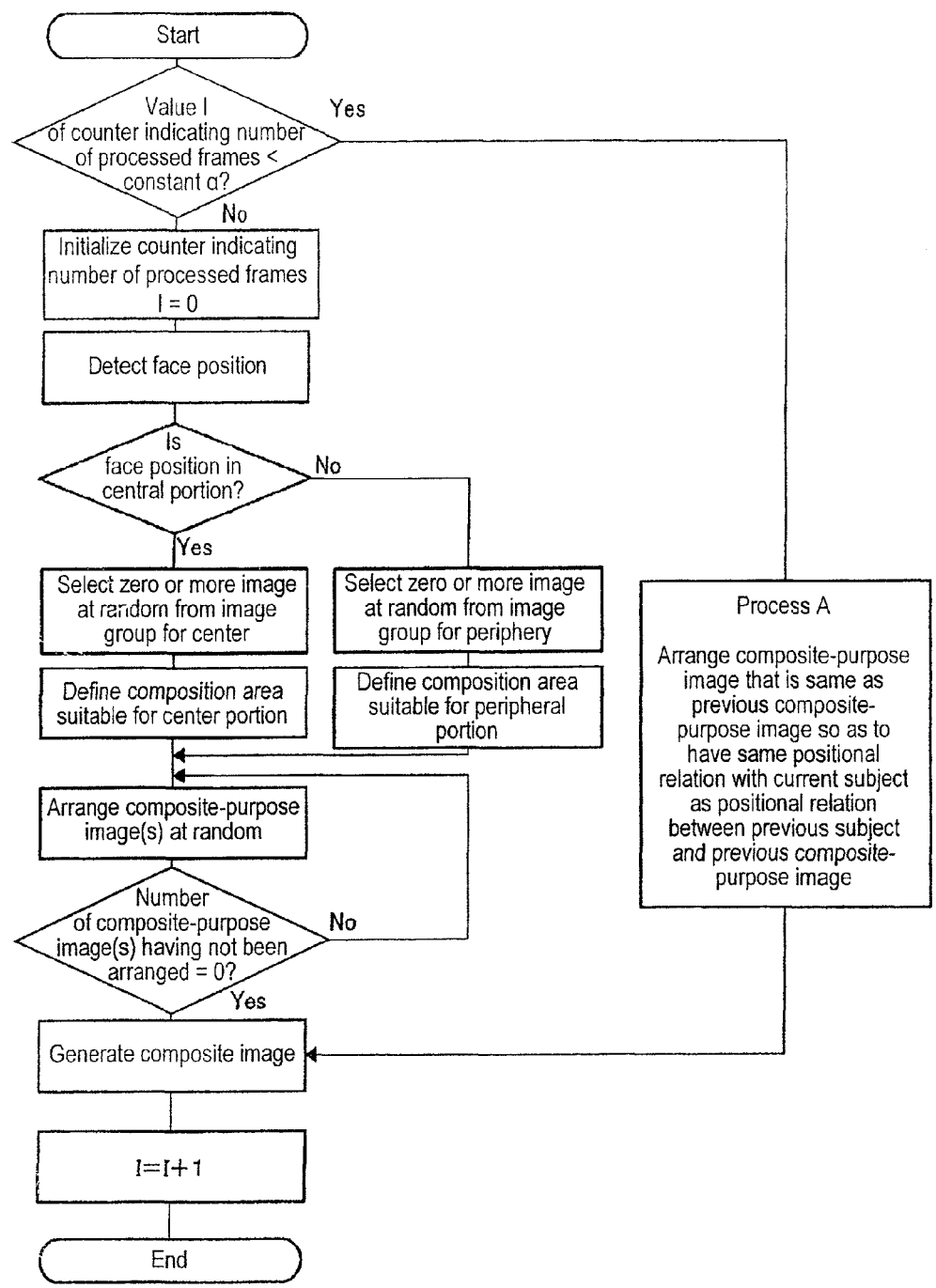
FIG. 22 is a flow chart showing a processing procedure according to a fourth embodiment of the invention.

FIG. 22 is a flow chart showing a processing procedure according to this embodiment. This embodiment will be described by way of example on the case where a composition process is applied to one frame image when composition-purpose images are combined with continuously captured images. Incidentally, the step of detecting a face position, the step of judging the arrangement of the face position by an arithmetic operation, the step of selecting composition-purpose images at random in accordance with the arrangement of the subject and the step of determining the arrangement of the selected composition-purpose images at random so that the composition-purpose images do not overlap with one another and do not overlap with the subject are the same as in the first embodiment.

In this embodiment, when composition-purpose images are combined with continuously captured images, the same composition-purpose image(s) as those used for the previous frame are arranged to obtain the same positional relation as the positional relation between the subject and each composition-purpose image in the previous frame until a predetermined time has passed or until a specific number of frames have been processed.

As shown in FIG. 22, a 'process A' is performed in the same manner as in the third embodiment if a value I of a counter indicating the number of processed frames is smaller than a constant α. When the value I of the counter indicating the number of processed frames is not smaller than the constant α, the value I of the counter indicating the number of processed frames is initialized to zero and the process described in the first embodiment is performed. When, for example, the constant α is set at 30, the composition process as described in the first embodiment is performed at intervals of 30 frames so that the resulting composite image changes. On the other hand, the 'process A' is applied to a frame at I smaller than 30, so that each composition-purpose image moves following the subject. In this embodiment, after the composition process is executed, the value I of the counter indicating the number of processed frames is updated (I=I+1 in FIG. 22) to make preparation for processing the next frame.

If the composition process described in the first embodiment is executed for each frame of the continuously captured images (through images or motion images), a result of composition varies widely according to the frame so that the resulting composite images are of no practical use because they are very hard to view due to flickering. Therefore, in accordance with this embodiment, the resulting composite images are stabilized because the composite image is updated at regular intervals so that each composition-purpose image follows the subject until the composite image is updated. Moreover, whenever the arrangement of the subject changes or whenever image capturing is started again, a different composition result can be obtained by random image composition so that the user can enjoy unexpected image capturing.

What is claimed is:

1. An image processing apparatus comprising:
   a subject detection unit that detects at least one subject in a captured image;
   a subject position analysis unit that judges arrangement of the at least one subject in the captured image by an arithmetic operation;
   an image selection unit that selects at least one composition-purpose image at random in accordance with the arrangement of the at least one subject;
   an image arrangement unit that determines arrangement of the selected at least one composition-purpose image at random so that the at least one composition-purpose image does not overlap with one another and does not overlap with the detected at least one subject; and
   an image composition unit that generates a composite image by combining the captured image with the at least one composition-purpose image.

2. The image processing apparatus according to claim 1, wherein the image arrangement unit selects a size for each of the at least one composition-purpose image to be arranged, at random from an image size range that is set in advance.

3. The image processing apparatus according to claim 1, wherein the image arrangement unit selects an inclination for each of the at least one composition-purpose images to be arranged, at random from an image inclination range that is set in advance.

4. The image processing apparatus according to claim 1, wherein when the number of detected subject is two or more, the image arrangement unit selects the at least one composition-purpose image based on an arrangement relation between the detected subjects.

5. The image processing apparatus according to claim 4, wherein the image selection unit selects the at least one composition-purpose image based on each distance between the subjects.

6. The image processing apparatus according to claim 1, wherein when the image composition unit generates the composite image from each of continuously captured images, if arrangement of the at least one subject in a current captured image is same as that of the at least one subject in a previous captured image, at least one composition-purpose image that is same as at least one composition-purpose image combined with the previous image is arranged so as to have a same positional relation with the at least one subject in the current captured image as a positional relation between the at least one subject in the previous captured image and the at least one composition-purpose image combined with the previous captured image.

7. The image processing apparatus according to claim 1, wherein when the image composition unit generates the composite image from each of continuously captured images, until a predetermined time has passed since an arbitrary image of the continuously captured images is captured or until a predetermined number of captured images has been processed, at least one composition-purpose image that is same as at least one composition-purpose image combined with the previous image is arranged so as to have a same positional relation with the at least one subject in the current captured image as a positional relation between the at least one subject in the previous captured image and the at least one composition-purpose image combined with the previous captured image.

8. The image processing apparatus according to claim 1, wherein each subject is a human face.

9. An imaging apparatus comprising:
   the image processing apparatus according to claim 1.

10. An image processing method comprising:
    detecting at least one subject in a captured image;
    judging arrangement of the at least one subject in the captured image by an arithmetic operation;
    selecting at least one composition-purpose image at random in accordance with the arrangement of the at least one subject;

determining arrangement of the selected at least one composition-purpose image at random so that the at least one composition-purpose image does not overlap with one another and does not overlap with the detected at least one subject; and generating a composite image by combining the captured image with the at least one composition-purpose image.

11. The image processing method according to claim 10, further comprising:

selecting a size for each of the at least one composition-purpose image to be arranged, at random from an image size range that is set in advance.

12. The image processing method according to claim 10, further comprising:

selecting an inclination for each of the at least one composition-purpose images to be arranged, at random from an image inclination range that is set in advance.

13. The image processing method according to claim 10, wherein when the number of detected subject is two or more, the at least one composition-purpose image is selected based on an arrangement relation between the detected subjects.

14. The image processing method according to claim 13, wherein the at least one composition-purpose image is selected based on each distance between the subjects.

15. The image processing method according to claim 10, wherein when the composite image is generated from each of continuously captured images, if arrangement of the at least one subject in a current captured image is same as that of the at least one subject in a previous captured image, at least one composition-purpose image that is same as at least one composition-purpose image combined with the previous image is arranged so as to have a same positional relation with the at least one subject in the current captured image as a positional relation between the at least one subject in the previous captured image and the at least one composition-purpose image combined with the previous captured image.

16. The image processing method according to claim 10, wherein when the composite image is generated from each of continuously captured images, until a predetermined time has passed since an arbitrary image of the continuously captured images is captured or until a predetermined number of captured images has been processed, at least one composition-purpose image that is same as at least one composition-purpose image combined with the previous image is arranged so as to have a same positional relation with the at least one subject in the current captured image as a positional relation between the at least one subject in the previous captured image and the at least one composition-purpose image combined with the previous captured image.

17. The image processing method according to claim 10, wherein each subject is a human face.

* * * * *